US011082516B2

(12) United States Patent
Liu et al.

(10) Patent No.: US 11,082,516 B2
(45) Date of Patent: Aug. 3, 2021

(54) COMPUTER DEVICES TO ESTABLISH NETWORK CONNECTIONS

(71) Applicant: HEWLETT-PACKARD DEVELOPMENT COMPANY, L.P., Spring, TX (US)

(72) Inventors: Wei Ze Liu, Spring, TX (US); Christopher Charles Mohrman, Spring, TX (US); Kimon Berlin, Fort Collins, CO (US); Jeffrey Kevin Jeansonne, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/761,003

(22) PCT Filed: Dec. 1, 2017

(86) PCT No.: PCT/US2017/064201
§ 371 (c)(1),
(2) Date: May 1, 2020

(87) PCT Pub. No.: WO2019/108226
PCT Pub. Date: Jun. 6, 2019

(65) Prior Publication Data
US 2020/0358869 A1 Nov. 12, 2020

(51) Int. Cl.
*H04L 29/08* (2006.01)
(52) U.S. Cl.
CPC .......... *H04L 67/2814* (2013.01); *H04L 67/02* (2013.01); *H04L 67/141* (2013.01)

(58) Field of Classification Search
None
See application file for complete search history.

(56) References Cited

U.S. PATENT DOCUMENTS

| 8,580,822 | B2 | 10/2013 | Chan et al. |
|---|---|---|---|
| 9,118,666 | B2 | 8/2015 | Naguib |
| 9,619,417 | B2 | 4/2017 | Hari et al. |
| 2005/0235007 | A1* | 10/2005 | Abali ............... G06F 11/1482 |
| 2010/0122075 | A1* | 5/2010 | Chen .................. G06F 9/4416 713/2 |
| 2010/0211769 | A1 | 8/2010 | Shankar et al. |
| 2013/0268666 | A1 | 10/2013 | Wilson |

(Continued)

FOREIGN PATENT DOCUMENTS

WO WO-2016089809 A1 6/2016

OTHER PUBLICATIONS

Hari, A et al, "The Swiss Army Smartphone: Cloud-based Delivery of USB Services", Oct. 23, 2011.

*Primary Examiner* — Scott B Christensen
(74) *Attorney, Agent, or Firm* — Perry + Currier Inc.

(57) ABSTRACT

A computer device includes a network interface to connect to a computer network, memory, and a processor connected to the network interface and the memory. The processor is to execute instructions stored in the memory. The instructions are to establish a connection with an auxiliary computer device and start a proxy to forward network communications between the auxiliary computer device and the computer network. The instructions are further to start the proxy in response to the computer device receiving a captive portal from the computer network.

14 Claims, 4 Drawing Sheets

(56) References Cited

U.S. PATENT DOCUMENTS

| | | |
|---|---|---|
| 2014/0181500 A1 | 6/2014 | Mann et al. |
| 2016/0156719 A1* | 6/2016 | Mobarak ................. H04L 63/10 726/4 |
| 2020/0326922 A1* | 10/2020 | Ferreira ........... G06K 19/06046 |

* cited by examiner

COMPUTER DEVICES TO ESTABLISH NETWORK CONNECTIONS

BACKGROUND

Access to various computer networks may be restricted. For example, a local network may provide access to a wider network, such as the internet, under certain conditions. Users wishing to access the internet must then satisfy these conditions. Public wireless networks, such as those sometimes provided by airports and hotels, often require users to agree to conditions or provide credentials in order to be granted access the internet.

DETAILED DESCRIPTION

A captive portal is a local web page that requests user input to proceed with a connection to a wider network, such as the internet. Captive portals may be served by local networks, such as airport Wi-Fi networks, hotel networks, and the like. Any locally served page that controls access to a wider network, such as the internet, may be considered a captive portal, whether it includes graphical elements, Hypertext Markup Language (HTML) elements, Cascading Style Sheets (CSS) elements, text elements, or similar.

If a user's computer cannot execute a user agent, such as a web browser, then the user may not be able provide the necessary input into a captive portal to connect to a wider network, despite the fact that the computer may have an active network connection to the local network. This can happen, for example, if the computer's operating system (OS) fails to boot properly. The computer's network stack may be operational, but the computer's graphical user interface may not be available. As such, it may be the case that the computer cannot perform an OS recovery process or other corrective process, such as a firmware update, that requires obtaining a resource from the internet.

When a computer is able to connect to a local network, but is blocked from access to the internet by a captive portal and is unable to execute a web browser or other user agent to interact with the captive portal, the computer may connect to an auxiliary device, such as a smartphone. The computer may start a proxy, so that the smartphone accesses the local network via the computer through the proxy. A web browser or other user agent at the smartphone may then be used to navigate the captive portal on behalf of the computer. Upon passing the captive portal, the local network grants internet access to the connection with the computer, and hence the proxy can be stopped. The computer thus becomes connected to the internet and may perform an OS recovery process or other corrective process that requires an internet connection, so as to rectify the fault that prevented execution of the computer's web browser in the first place.

Figure 1:
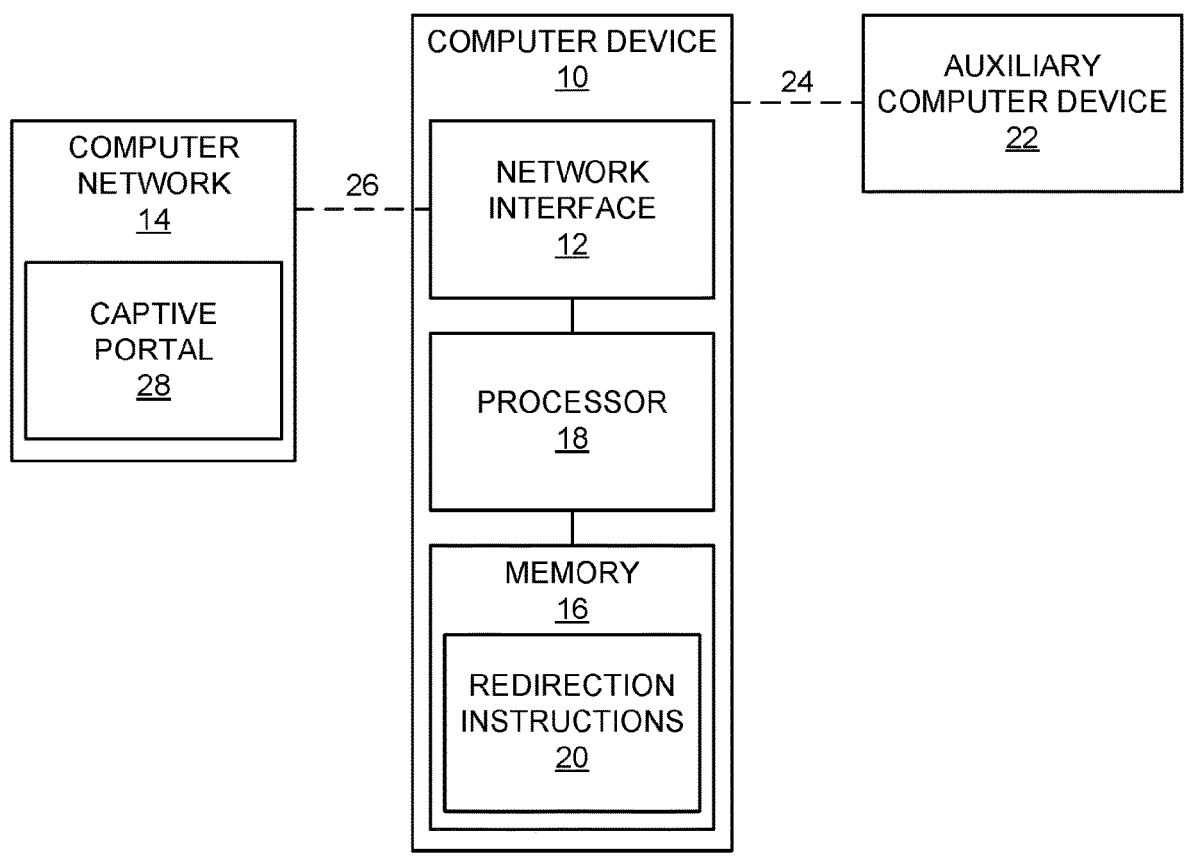
FIG. 1 is a block diagram of an example computer device.

FIG. 1 shows an example computer device 10. The computer device 10 includes a network interface 12 to connect to a computer network 14, memory 16, and a processor 18 connected to the network interface 12 and the memory 16.

The processor 18 may include a central processing unit (CPU), a microcontroller, a microprocessor, a processing core, a field-programmable gate array (FPGA), or similar device capable of executing instructions. The processor 18 may cooperate with memory to execute instructions. Memory 16 may include a non-transitory machine-readable storage medium that may be any electronic, magnetic, optical, or other physical storage device that stores executable instructions. The machine-readable storage medium may include, for example, random access memory (RAM), read-only memory (ROM), electrically-erasable programmable read-only memory (EEPROM), flash memory, a storage drive, an optical disc, and the like. The machine-readable storage medium may be encoded with executable instructions.

Redirection instructions 20 may be stored in the memory 16 for execution by the processor 18. The redirection instructions 20 may be to establish a connection 24 between the computer device 10 and an auxiliary computer device 22, such as a smartphone, tablet computer, or other type of computer device. The connection of the computer device 10 and the auxiliary computer device 22 may be a direct wired connection or a direct wireless connection. Example wired connections include a Universal Serial Bus (USB)™ connection, a serial cable connection, and the like. Example wireless connections include a Bluetooth™ connection, a radio-frequency identification (RFID) connection, and the like.

A connection 26 of the computer device 10 to the computer network 14 via the network interface 12 may a wired connection or a wireless connection. Example connections include Ethernet connections and Institute of Electrical and Electronics Engineers (IEEE)™ 802.11 (e.g., Wi-Fi™) wireless connections. The connection 26 may be a local wireless connection to a local-area network (LAN). The interface between the computer device 10 and the computer network 14 may be a network access point (AP) of the computer network 14, where the AP is to provide a captive portal 28.

The redirection instructions 20 may be to start a proxy to forward network communications between the auxiliary computer device 22 and the computer network 14. The proxy may be started in response to the computer device 10 receiving a captive portal 28 from the computer network 14 over the connection 26. That is, the computer device 10 receiving the captive portal 28 may be a condition that starts the proxy.

The redirection instructions 20 may be to detect a captive portal by, for example, detecting Hypertext Transfer Protocol (HTTP) redirection such as a HTTP status code 302. In another example, the redirection instructions 20 may be to parse a received web page for text or other content elements that identify the page as a captive portal. For example, the web page may include keywords such as "portal", "access", "log in", and the like that may be parsed to identify a captive portal.

The redirection instructions 20 may be to detect a captive portal by, for example, determining a lack of connectivity to an expected resource. Lack of availability of an expected resource may indicate lack of connection to the internet, which may be taken as detection of a captive portal.

The redirection instructions 20 may trigger the starting of the proxy based on various other conditions. The redirection instructions 20 may be to determine that a network stack for the network interface 12 is operational as a condition to start the proxy. That is, if the network stack is not available, then the proxy is not started, as communications with the computer network 14 would not be possible.

The redirection instructions 20 may be to determine whether an OS executable by the processor fails to boot. Failure of the OS to boot may be a condition to start the proxy. As such the proxy may be started when OS boot failure is detected. In such case, the proxy may allow for the captive portal 28 to be passed using the user interface of the auxiliary computer device 22, so that resources available via the internet may be used to repair or recover the OS.

The redirection instructions 20 may be to determine whether a web browser or other user agent is executable. Lack of a functioning web browser or other user agent may be a condition to start the proxy. As such the proxy may be started when a web browser or other user agent is determined to be not executable. Hence, the proxy may allow for the captive portal 28 to be passed so that resources available via the internet may be obtained to repair the web browser or download a new web browser. Moreover, lack of a functioning web browser may be indicative of an OS failure that should be repaired or recovered.

Various combinations of conditions may be used to determine whether the proxy is to be started. In some examples, detection of an active TCP/IP process with the absence of an OS process for a threshold time may be a condition that allows the redirection instructions 20 to start the proxy upon reception of a captive portal 28.

In other examples, the instructions 20 may be to detect input of a user command, such as a key press, and start the proxy in response to the user command. That is, the user may be notified that a captive portal 28 has been received and may be given the option to start the proxy, so that an auxiliary computer device 22 may be used to pass the captive portal 28. Such a prompt may be issued by a Basic Input/Output System (BIOS), Unified Extensible Firmware Interface (UEFI), or other interface available prior to OS boot.

In still other examples, the instructions 20 may start the proxy prior to OS boot regardless of conditions, such as those mentioned above. That is, the user interface of the auxiliary computer device 22 may be used during boot of the OS of the computer device 22 to access the computer network 14, even if OS boot occurs normally.

The redirection instructions 20 may further be to stop the proxy in response to an indication that the internet is available via the connection 26 of the network interface 12 to the computer network 14. That is, once the captive portal 28 has been passed using the user interface of the auxiliary computer device 22, the redirection instructions 20 may cease forwarding network communications between the auxiliary computer device 22 and the computer network 14. The user interface of the auxiliary computer device 22 acted as a surrogate for the unavailable OS or browser of the computer device 10, and since the internet is available at the computer device 10 via the connection 26, the computer device 10 may obtain resources from the internet without further action needed. There is no need to perform a handoff or transfer of network addresses or credentials between the auxiliary computer device 22 and the computer device 10.

In other examples, the redirection instructions 20 may stop the proxy based on another condition, such as detection of boot completion of the OS of the computer device 10, detection of availability of a web browser or other user agent at the computer device 10, detection of a user command at the computer device 10, and similar.

The proxy may include executing instructions at the auxiliary computer device 22. Such instructions may be to redirect communications of a web browser or other user agent at the auxiliary computer device 22 to the computer device 10.

Figure 2:
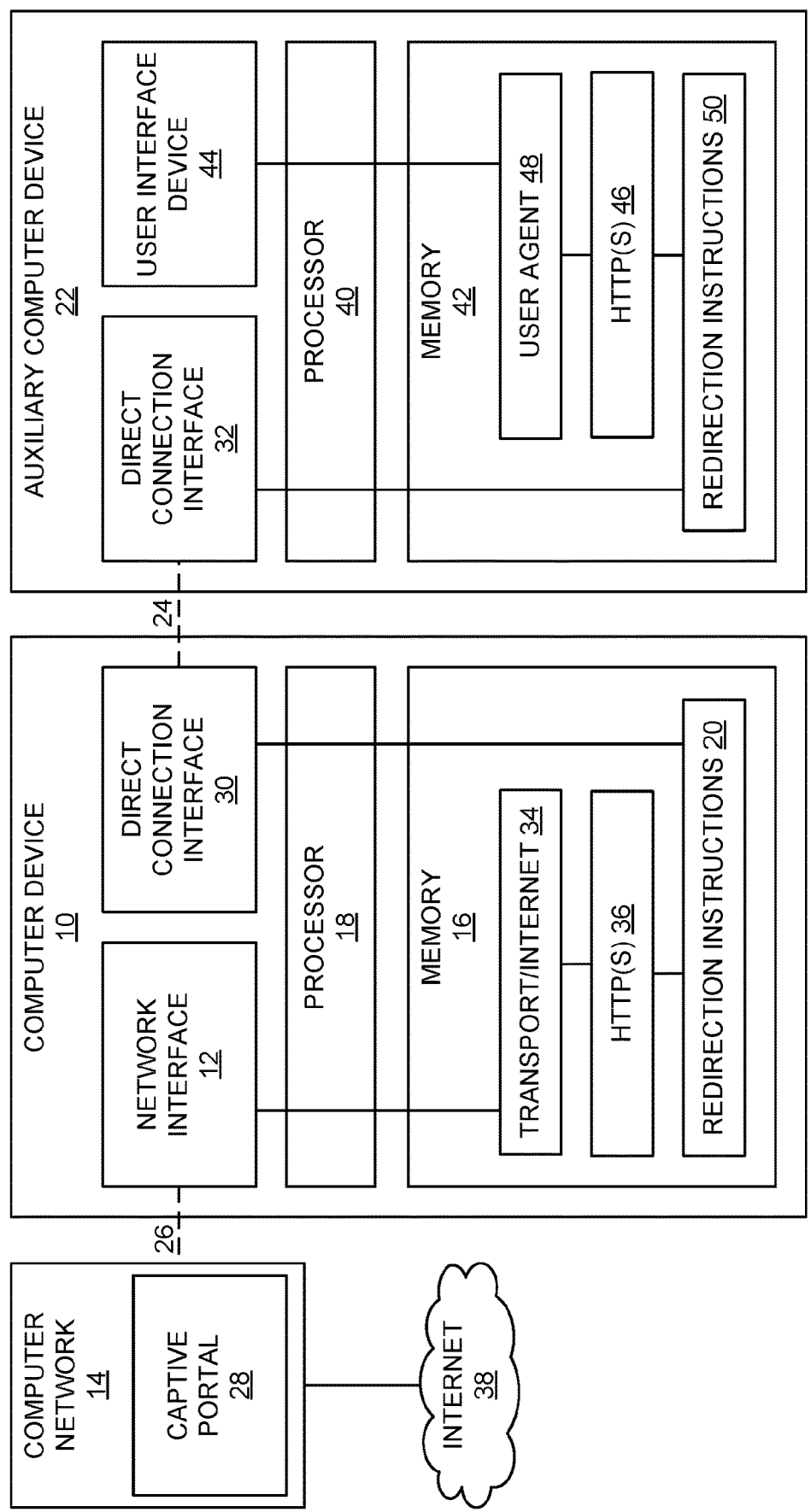
FIG. 2 is a block diagram of an example system.

As shown in FIG. 2, a computer device 10 may include a direct connection interface 30 to connect to a direction connection interface 32 of an auxiliary computer device 22. The direct connection interfaces 30, 32 may be Bluetooth interfaces, USB interfaces, or other interfaces that allow for point-to-point connection of the devices 10, 22. The direct connection interface 30 of the computer device 10 may be separate from the network interface 12. The direct connection interface 30 may operate independently of the network interface 12.

The computer device 10 may include a transport/network protocol stack 34, which may include an Internet Protocol (IP), a Transmission Control Protocol (TCP), a Transport Layer Security (TLS) protocol, a Dynamic Host Configuration Protocol (DHCP), and similar. The transport/network protocol stack 34 may be stored in memory 16 and may be executed by the processor 18, such that it is available before an OS is booted. The computer device 10 may be referred to as a pre-boot computer device that is able to connect to a computer network prior to its OS booting.

The computer device 10 may further include a HTTP or HTTP Secure (HTTPS) 36 to process HTTP(S) communications between the computer device 10 and the computer network 14 and further with the internet 38, as accessible via the computer network 14. The HTTP(S) 36 may be stored in memory 16 and may be executed by the processor 18, such that it is available before an OS is booted.

The transport/network protocol stack 34 and HTTP(S) 36 are an example of a network stack. In other examples, different protocols may be used.

Redirection instructions 20 may be to use HTTP(S) 36 to communicate with the computer network 14 via the transport/network protocol stack 34. The redirection instructions 20 may be implemented as a redirection driver that communicates the HTTP(S) 36 with the direct connection interface 30. The redirection instructions 20 may be implemented in a BIOS or UEFI of the computer device 10.

The auxiliary computer device 22 may include a processor 40 and memory 42 of the types discussed elsewhere herein. The auxiliary computer device 22 may further include a user interface device, such as a touchscreen, display device, keyboard, and similar.

The memory 42 of the auxiliary computer device 22 may store an HTTP(S) 46 executable by the processor 40. The memory 42 may further store a user agent 48, such as a web browser, executable by the processor 40 to provide output to and receive input from the user interface device 44.

Auxiliary redirection instructions 50 may be stored in the memory 42 of the auxiliary computer device 22 to be executed by the processor 40. The instructions 50 may be to use HTTP(S) 46 to communicate with the computer device 10 via the direct connection interface 32. The instructions 50 may be implemented as a driver that applies HTTP(S) 46 to the direct connection interface 32. The instructions 50 may be to forward incoming HTTP(S) communications received from the direct connection interface 32 to the user agent 48. The user agent 48 may be provided with proxy information to direct outgoing HTTP(S) communications to the instructions 50, which forwards the outgoing communications to the direct connection interface 32 and thus to the computer device 10.

The auxiliary redirection instructions 50 may be implemented as a driver, as a plugin for a web browser or other user agent, as an application, as a combination of these, or similar.

The redirection instructions 20 at the computer device 10 may forward HTTP communications received from the computer network 14 to the auxiliary computer device 22 via the direct connection interfaces 30, 32. Similarly, the redirection instructions 20 may forward HTTP communications received from the auxiliary computer device 22 via the direct connection interfaces 30, 32 to the computer network.

As such, the redirection instructions 20, 50 serve to communicate HTTP(S) data between the computer network 14 and the auxiliary computer device 22 over the connection 26 provided by the computer device 10. The user agent 48 at the auxiliary computer device 22 may thus be used as a surrogate for an inoperative user agent at the computer device 10. When the redirection instructions 20 at the computer device 10 are stopped, the connection 26 of the computer device 10 to the computer network 14 remains and communications via HTTP(S) 36 and the transport/network protocol stack 34 are processed normally by the computer device 10, for example, by an OS recovery process. When the auxiliary redirection instructions 50 at the auxiliary computer device 22 are stopped, communications via HTTP (S) 46 are processed normally by the user agent 48 to allow communication by the auxiliary computer device 22 with the computer network 14 or with another computer network via a pathway that does not include the computer device 10. That is, the auxiliary computer device 22 may have connectivity to the internet 38 or other computer network separate from the connection to the computer network 14 facilitated by the direct connection interfaces 30, 32.

Figure 3:
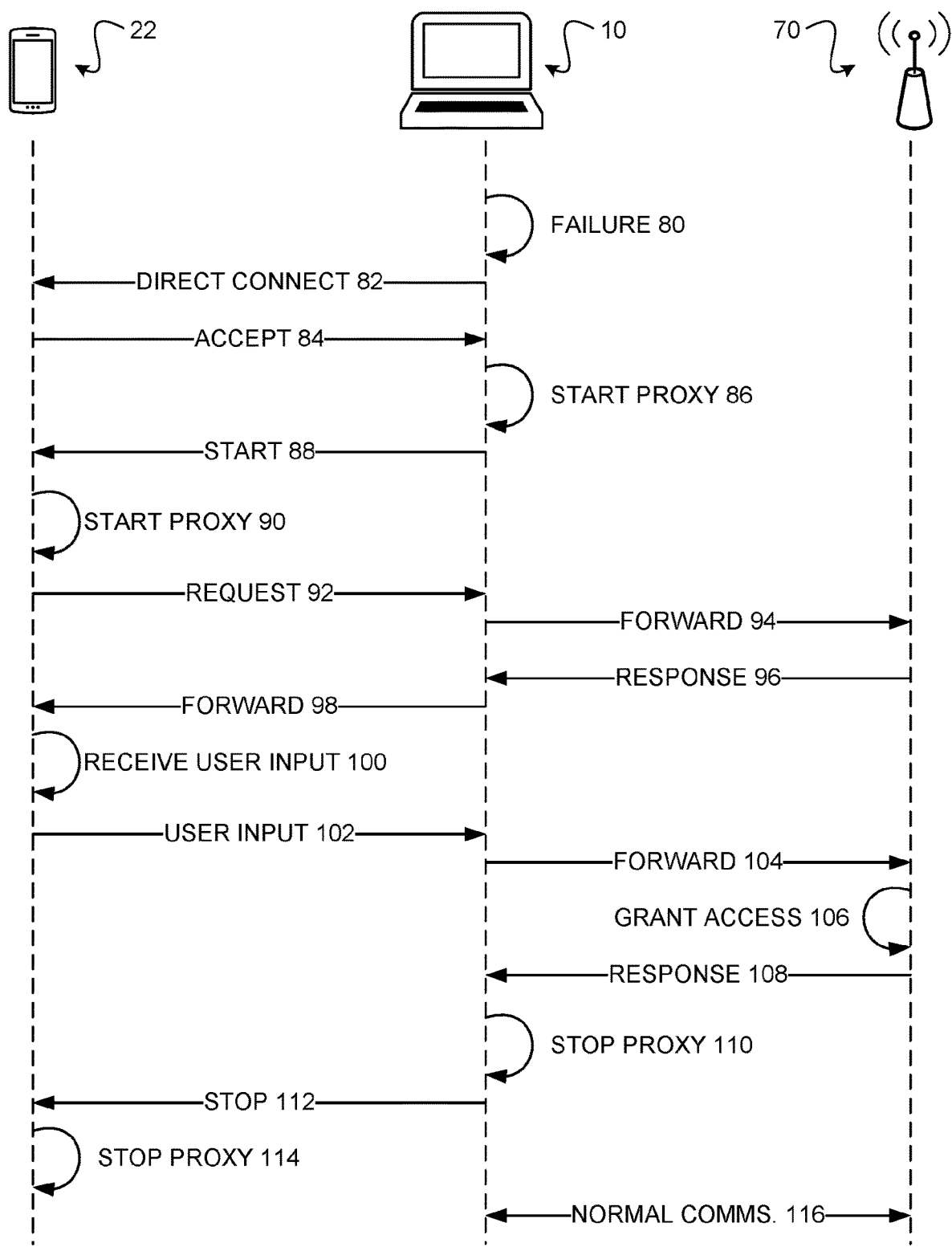
FIG. 3 is a diagram of an example method of accessing a computer network.

FIG. 3 shows an example method of accessing a computer network. An example computer device 10, an example auxiliary computer device 22, and an example network access point 70 are referenced, though the method may be performed by other devices. The computer device 10 and auxiliary computer device 22 may be as described elsewhere herein. The network access point 70 may be an access point of a local computer network, such as the network 14. The method may be implemented by processor-executable instructions at the computer device 10 and the auxiliary computer device 22.

Initially the computer device 10 may detect a failure 80 to connect to the internet or other wide area network beyond the local network provided by the access point 70. That is, the computer device 10 can connect to the access point 70 via Wi-Fi or other technology, but the network provided by the access point 70 does not allow the computer device 10 to connect to the internet or other wider network. This may be due to the computer device 10 failing to complete an OS boot and the access point 70 serving a captive portal to the computer device 10. A web browser or other user agent cannot be loaded to allow the user to enter necessary information to pass the captive portal. Other examples of a failure 80 include failure of the OS to load a web browser.

In response to the failure 80, the computer device 10 may directly connect 82 to the auxiliary computer device 22, which may accept 84 the connection. The connection between the computer device 10 and the auxiliary computer device 22 may be a direct connection independent of the connectivity or lack thereof of the computer device 10 to the access point 70 or network(s) provided by the access point 70. Further, the direct connection may be independent of connectivity or lack thereof of the auxiliary computer device 22 to the access point 70 and to network(s) provided by the access point 70, such as a wider network and the internet. That is, the auxiliary computer device 22 may have its own internet connection available through a network interface of the auxiliary computer device 22, and such internet connection may be independent from the direct connection to the computer device 10. Examples of direct connections include Bluetooth and USB connections.

Accepting 84 the direct connection at the auxiliary computer device 22 may include receiving user input at the auxiliary computer device 22. This may confirm that the same user has control of both devices 10, 22.

At about the same time, the computer device 10 may start 86 a proxy, which may include associating the direct connection with the auxiliary computer device 22 to communications with the access point 70. Redirection instructions executable by the computer device 10 may forward communications received from the access point 70 to the directly connected auxiliary computer device 22 and may forward communications received from the auxiliary computer device 22 to the access point 70.

The computer device 10 may also instruct, via the direct connection, the auxiliary computer device 22 to start 88 the proxy. The auxiliary computer device 22 starting the proxy may include the auxiliary computer device 22 associating a user agent with the direct connection to the computer device 10. Auxiliary redirection instructions executable by the computer device 10 may forward requests made by the user agent to the directly connected computer device 10 and may forward responses received from the computer device 10 to the user agent. An example user agent is a web browser. Starting the proxy at the auxiliary computer device 22 may include configuring the browser to make HTTP(S) communications through the direct connection to the computer device 10.

Then, the auxiliary computer device 22 may make a request 92 to the computer network provided by the access point 70. The request is made through the computer device 10, which forwards 94 the request to the access point 70. An example request may be a request to determine whether the auxiliary computer device 22 is connected to the internet. For instance, the request may be for a resource that is known to be available.

The access point 70 may then respond 96 to the request as if the computer device 10 made the request. The response may include a captive portal that is blocking access to the internet or wider network, or redirection to such a captive portal.

The computer device 10 may forward 98 the response provided by the access point 70 to the auxiliary computer device 22 over the direct connection. The user agent or browser at the auxiliary computer device 22 may present information to the user. A captive portal page may be displayed. The captive portal page may request user's credentials, a confirmation that connection to the internet is desired, an agreement to terms of service for network access, and similar.

The auxiliary computer device 22 may then receive 100 input from the user in response to the captive portal. For example, the user may enter their username and password and click a checkbox to agree to terms of service.

The auxiliary computer device 22 may then communicate the user input 102 to the computer network provided by the access point 70. The user input is communicated through the computer device 10, which forwards 104 the user input to the access point 70.

The access point 70 then determines whether to grant access 106 to the internet or wider network on the basis of the user input provided. The access point 70 communicates a response 108 to the computer device 10 indicating a granting or denying of access.

The computer device 10 may then determine whether access to the internet or wider network has been granted. If access has not been granted, the proxy remains active and the computer device 10 continues to forward communications between the auxiliary computer device 22 and the access point 70. In the example of a captive portal, access may be denied if the user's provided credentials were not authorized for access.

If the computer device 10 determines that access has been granted to the internet or wider network, then, in response, the computer device 10 may stop the proxy 110 at the computer device 10 and transmit a command to the auxiliary computer device 22 to stop 112 the proxy at the auxiliary computer device 22. In response to the command, the auxiliary computer device 22 may stop 114 the proxy as executed by the auxiliary computer device 22.

The computer device 10 may determine whether access has been granted to the internet or wider network by inspecting the response 108 provided by the access point. For example, the response 108 may include an HTTP(S) status code indicative of the granted access. The computer device 10 may track HTTP(S) status codes for various responses and analyze a series of status codes to determine that access has been granted. The computer device 10 may parse a received web page for text or other content elements that indicate granted access. For example, such a page may include keywords such as "grant", "welcome", "log in successful" that may be parsed to determine that access to the internet has been granted.

Since the connection between the computer device 10 and the access point 70 has been granted access to the internet or wider network, nothing further need be done for the computer device 10 to communicate with the internet or wider network. Normal communications 116 between the computer device 10 and the internet or wider network as facilitated by the access point 70 may commence. The computer device 10 may download an OS recovery resource or other resource that may avoid recurrence of the original failure 80.

Figure 4:
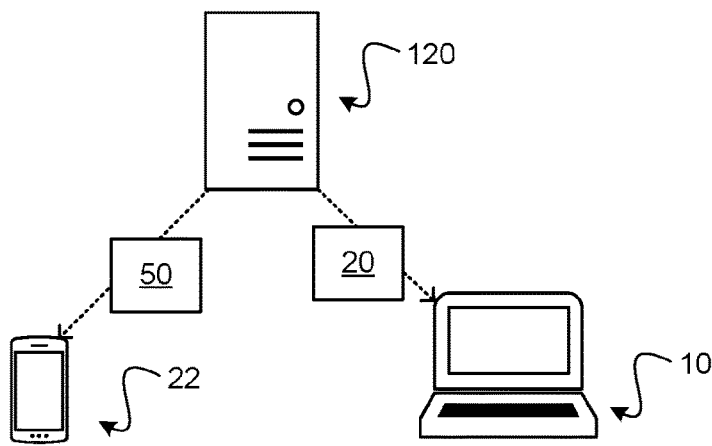
FIG. 4 is a diagram of example deployment of instructions to an example computer device and an example auxiliary computer device.

With reference to FIG. 4, redirection instructions 20 may be provided to the computer device 10 at time of manufacture; during OS, firmware, or driver installation; during OS, firmware, or driver update; or during configuration by an organization deploying the computer device 10. Auxiliary redirection instructions 50 may be provided to the auxiliary computer device 22 at time of manufacture; during OS, firmware, or driver installation; during OS, firmware, or driver update; or during configuration by an organization deploying the auxiliary computer device 22. A server 120 may include a non-transitory machine-readable storage medium, such as discussed elsewhere herein, to store the instructions 20, 50. The server 120 may deploy the instructions 20, 50 to the respective device 10, 22. The server 120 may offer the instructions 20, 50 for download at a user's convenience.

Figure 5:
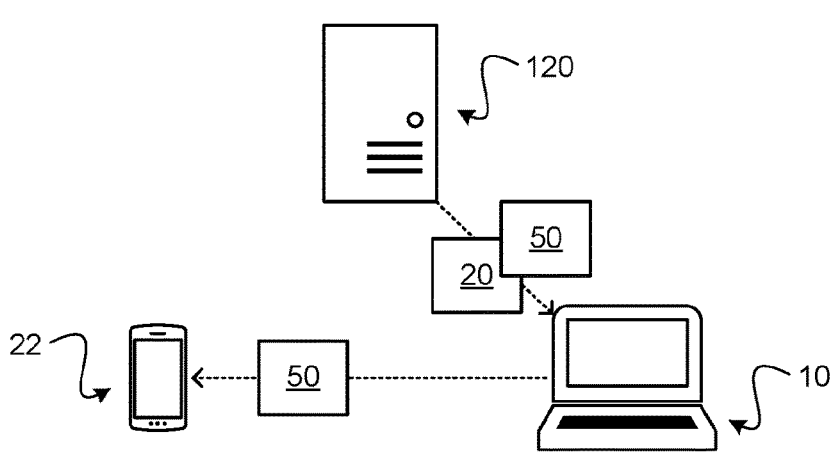
FIG. 5 is a diagram of example deployment of instructions from an example computer device to an example auxiliary computer device.

With reference to FIG. 5, redirection instructions 20 and auxiliary redirection instructions 50 may be provided to the computer device 10 as discussed above. Then, the auxiliary redirection instructions 50 may be communicated from the computer device 10 to the auxiliary computer device 22 at a later time, such as by using a direct connection between the computer device 10 and the auxiliary computer device 22. This may allow for any convenient auxiliary computer device 22 in the control of the user of the computer device 10 to be used as a surrogate user interface device to establish an internet connection for the computer device 10.

Figure 6:
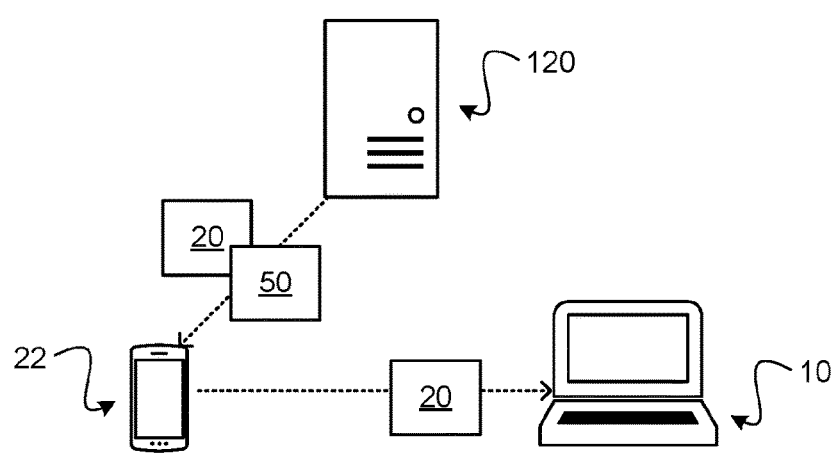
FIG. 6 is a diagram of example deployment of instructions from an example auxiliary computer device to an example computer device.

With reference to FIG. 6, the redirection instructions 20 and auxiliary redirection instructions 50 may be provided to the auxiliary computer device 22 as discussed above with respect to FIG. 4. Then, the redirection instructions 20 may be communicated from the auxiliary computer device 22 to the computer device 10 at a later time, such as by using a direct connection between the auxiliary computer device 22 and the computer device 10. This may allow for the instructions 20, 50 to be downloaded from the server 120 by auxiliary computer device 22 on an as-needed basis, as needed to repair the computer device 10.

As discussed above, a connection to the internet or wider network may be established for a pre-boot computer device by using an auxiliary computer device to navigate a page, such as a captive portal, served by a local network. The local network connection of the pre-boot computer device may be used by the auxiliary computer device, which provides user-interface functionality that may not be available at the pre-boot computer device. After the auxiliary computer device has been used to pass the captive portal, the pre-boot computer device may use the connection to access the internet or wider network to, for example, obtain a resource that may allow the pre-boot computer device to complete booting of its OS.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A computer device comprising:
a network interface to connect to a computer network;
memory; and
a processor connected to the network interface and the memory, the processor to execute instructions stored in the memory, the instructions to:
  receive a captive portal from the computer network responsive to an attempt to connect to the computer network;
  detect a failure to connect to the computer network responsive to the attempt to connect to the computer network;
  in response to receiving the captive portal and detecting the failure:
    automatically establish a connection with an auxiliary computer device,
    start a proxy to forward network communications between the auxiliary computer device and the computer network, and
    forward the received captive portal to the auxiliary computing device to enable the auxiliary computing device to interact with the computer network via the proxy using the captive portal to enable the computer device to connect to the computer network.

2. The device of claim 1, wherein the instructions are further to stop the proxy in response to an indication that an internet is available via a connection of the network interface to the computer network.

3. The device of claim 1, wherein the instructions are further to determine whether an operating system executable by the processor fails to boot and to start the proxy in response to receiving the captive portal when the operating system fails to boot.

4. The device of claim 1, wherein the instructions are further to determine whether a web browser is executable by the processor and to start the proxy in response to receiving the captive portal if the web browser is determined to be not executable.

5. The device of claim 1, further comprising a direct connection interface separate from the network interface, the instructions to establish the connection with the auxiliary computer device via the direct connection interface.

6. The device of claim 1, wherein the instructions are further to determine that a network stack of the computer device is operational as a condition to start the proxy.

7. The device of claim 1, wherein the computer device is a pre-boot computer device.

8. A non-transitory machine-readable storage medium containing instructions that are executable by a processor to establish a direct connection between a computer device and an auxiliary computer device, which when executed cause the processor to:
    receive a captive portal from a computer network responsive to an attempt to connect to the computer network;
    detect a failure of the computer device to connect to the computer network responsive to the attempt to connect to the computer network;
    in response to receiving the captive portal and detecting the failure:
        automatically establish a connection with the auxiliary computer device,
        start a proxy to forward communications between the auxiliary computer device and the computer network, and
        forward the received captive portal to the auxiliary computer device to enable the auxiliary computing device to interact with the computer network via the proxy using the captive portal to enable the computer device to connect to the computer network.

9. The storage medium of claim 8, wherein the instructions are further to stop the proxy in response to an indication that the computer network is available to the computer device through the local network.

10. The storage medium of claim 8, wherein the instructions include redirection instructions executable by a processor of the computer device and auxiliary redirection instructions executable by a processor of the auxiliary computer device.

11. The storage medium of claim 10, wherein the instructions further include proxy information to be provided to a web browser of the auxiliary computer device.

12. The storage medium of claim 8, wherein the instructions are to establish the direct connection between the computer device and the auxiliary computer device as independent from the connection of the computer device to a local network.

13. The storage medium of claim 12, wherein the instructions are to establish the direct connection between the computer device and the auxiliary computer device as independent from connectivity of the auxiliary computer to the computer network.

14. The storage medium of claim 8, wherein the non-transitory machine readable medium is executed by a pre-boot computer device.

* * * * *